United States Patent [19]
Shearer et al.

[11] Patent Number: 5,987,804
[45] Date of Patent: Nov. 23, 1999

[54] MULTIPLE FISHING ROD HOLDER AND FISHING ROD CRADLE

[76] Inventors: Joseph Shearer, P.O. Box 79, Lancaster, Ky. 40444; Charles Sweetser, 206 Wildwood La., Wilmore, Ky. 40390

[21] Appl. No.: 08/994,487

[22] Filed: Dec. 19, 1997

[51] Int. Cl.[6] .................................................. A01K 97/10
[52] U.S. Cl. .............................................................. 43/21.2
[58] Field of Search .............................. 43/21.2; 248/512, 248/511, 513, 534, 538

[56] References Cited

U.S. PATENT DOCUMENTS

| | | | |
|---|---|---|---|
| 2,137,645 | 11/1938 | Doench | 43/21.2 |
| 4,645,167 | 2/1987 | Hardwick . | |
| 4,877,165 | 10/1989 | Behrle . | |
| 5,014,458 | 5/1991 | Wagner | 43/21.2 |
| 5,237,769 | 8/1993 | Navarro | 43/21.2 |
| 5,295,321 | 3/1994 | Matura . | |
| 5,325,620 | 7/1994 | Reed et al. . | |
| 5,341,589 | 8/1994 | Gutierrez . | |
| 5,557,877 | 9/1996 | Colson | 43/21.2 |
| 5,564,670 | 10/1996 | Dysarz . | |

FOREIGN PATENT DOCUMENTS

| 774634 | 5/1957 | United Kingdom | 43/21.2 |
|---|---|---|---|

*Primary Examiner*—Jack W. Lavinder
*Attorney, Agent, or Firm*—Richard C. Litman

[57] ABSTRACT

A holder for multiple fishing rods pivotally attached to the support column of a swivel mounted boat chair, with cradles for each rod capable of independent angular adjustment. The rod cradles are mounted to an arcuate mounting member which allows the rods to be regularly spaced yet remain equidistant from the user. A vertically adjustable arm is secured perpendicularly to the support column of a chair using a collar and hand operated threaded fastener. Releasably attached the other end of the arm is a laterally disposed arcuate support member, supporting a plurality of fishing rod holders. A unitary fishing rod cradle made up of parallel horizontal side rails, a U-shaped rod receiver, a loop rod stabilizer, and an arcuate pivot support slot for pivotal attachment to the arcuate support member.

11 Claims, 3 Drawing Sheets

MULTIPLE FISHING ROD HOLDER AND FISHING ROD CRADLE

BACKGROUND OF THE INVENTION

1. Field of the Invention

The present invention relates to fishing rod holders, and more specifically to a modular holding mechanism supporting multiple fishing rods in association with a stationary vertical support column, such as the disclosed boat seat pedestal. The invention also relates to fishing rod holders, and more specifically to a holder made up of a particular arrangement of bent, rigid wires.

2. Description of the Related Art

Devices have been proposed by which a fishing rod may be cradled and supported. Such devices are well known in the art as evidenced by the Gary L. Hardwick, U.S. Pat. No. 4,645,167; William L. Behrle, U.S. Pat. No. 4,877,165; Albert J. Matura, U.S. Pat. No. 5,295,321; Bernard L. Reed et al., U.S. Pat. No. 5,325,620; Manuel Gutierrez, U.S. Pat. No. 5,341,589; Kennie R. Colson, U.S. Pat. No. 5,557,877; Edward D. Dysarz, U.S. Pat. No. 5,564,670. The patents to Reed et al., and Hardwick disclose a chair attached fishing rod support. The patent to Colsen discloses a universal mount fishing rod holder for holding a plurality of fishing rods wherein each individual fishing rod holder is formed of elongated ridged wire having an open V-shaped end and a looped end. The patent to Dysarz discloses a cleat mounted holding device which may be pivoted relative to the cleat and secured in the desired direction and angle by a wing bolt.

However, none of the prior art fishing rod holding devices include the combination of a holder for multiple fishing rods, holders for each rod formed of elongated ridged wire having an open U-shaped end and a looped end, independent angular adjustment of each holder, and vertically adjustable attachment of the device to the support column of a swivel mounted boat chair. Nor are any of the multiple fishing rod holders mounted to an arcuate mounting member which allows the rods to be regularly spaced apart yet remain equidistant from the user.

None of the above inventions and patents, taken either singularly or in combination, is seen to describe the instant invention as claimed. Thus a multiple fishing rod holder solving the aforementioned problems is desired.

SUMMARY OF THE INVENTION

A holder for multiple fishing rods is attached to the support column of a swivel mounted boat chair and has fishing rod cradles for each rod which are capable of independent angular adjustment.

The fishing rod cradles are mounted to an arcuate mounting member which allows the rods to be regularly spaced apart yet remain equidistant from the user. A vertically adjustable arm is secured perpendicularly to the support column of a chair using a collar and a hand operated threaded fastener. A friction cleat is disposed on the bottom of the arm which maintains the rod holder in position. Releasably attached to the other end of the arm is a laterally disposed arcuate support member supporting a plurality of fishing rod holders. Each unitary fishing rod cradle comprises a U-shaped rod receiver, a loop rod stabilizer and an arcuate pivot support slot for pivotal attachment to the arcuate support member.

Accordingly, it is a principal object of the invention to provide the combination of a holder for multiple fishing rods, holders for each rod formed of elongated rigid wires and having an open U-shaped end and a looped end, independent angular adjustment of each holder, and a vertically adjustable attachment for the device to the support column of a swivel mounted boat chair.

It is also an object of the invention to provide an arcuate mounting member which allows the fishing rods to be regularly spaced apart yet remain equidistant from the user.

It is another object of the invention to provide a holder of multiple fishing rods which is attached, so as to allow vertical adjustment to the support column of a swivel mounted boat chair.

It is a further object of the invention to provide a fishing rod cradle comprising a U-shaped rod receiver, parallel horizontal side rails, a loop rod stabilizer and arcuate pivot support slot for pivotal attachment to the arcuate support member.

Still another object of the invention is to provide fishing rod cradles for each rod which are capable, in cooperation with the arcuate support member, of independent angular adjustment.

It is an object of the invention to provide improved elements and arrangements thereof in a multiple fishing rod holder for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
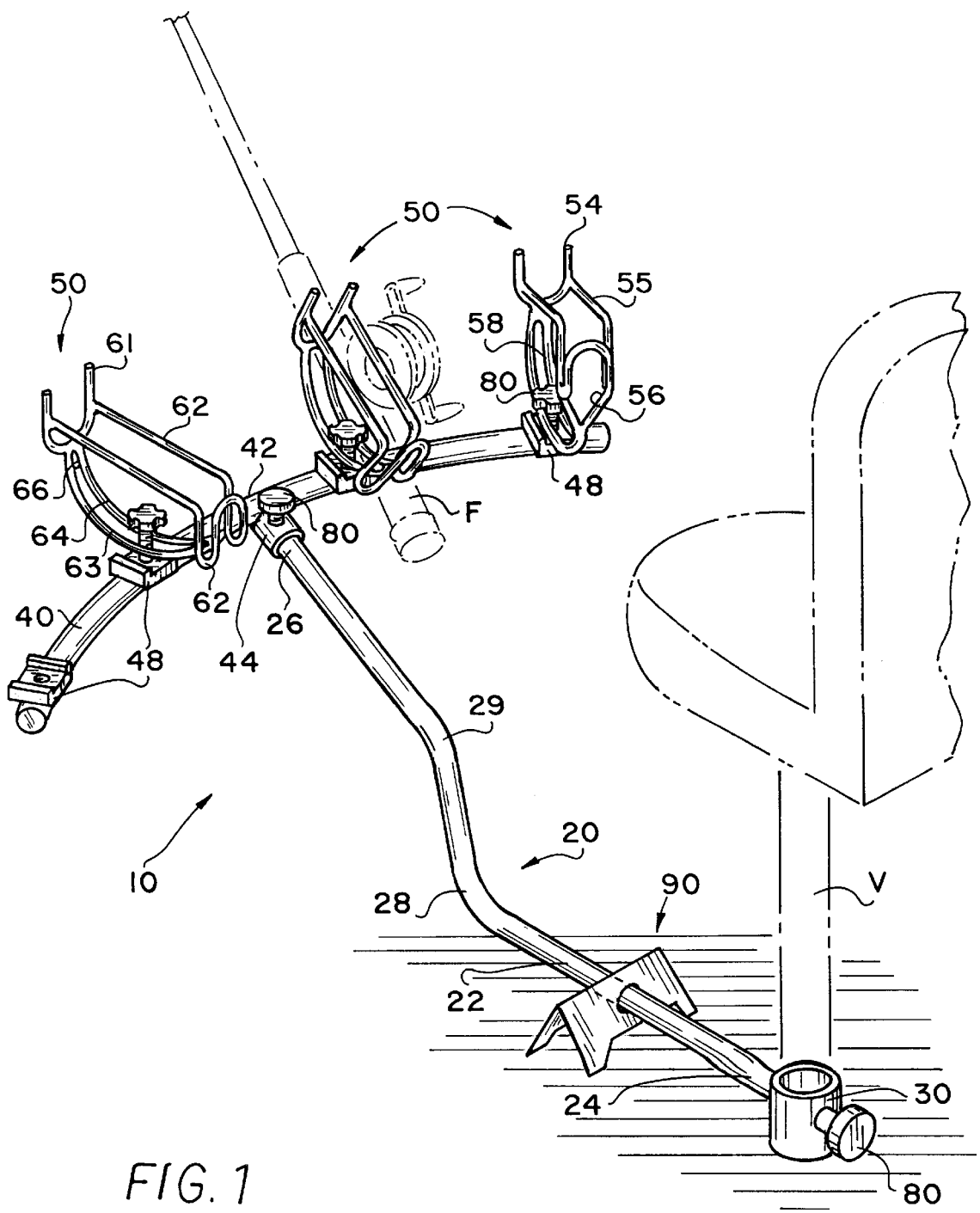
FIG. 1 is an environmental perspective view of the multiple fishing rod holder according to the present invention.

Referring to the figures by numerals of reference, a multiple fishing rod holder generally designated by the reference numeral 10 will be described.

Figure 2:
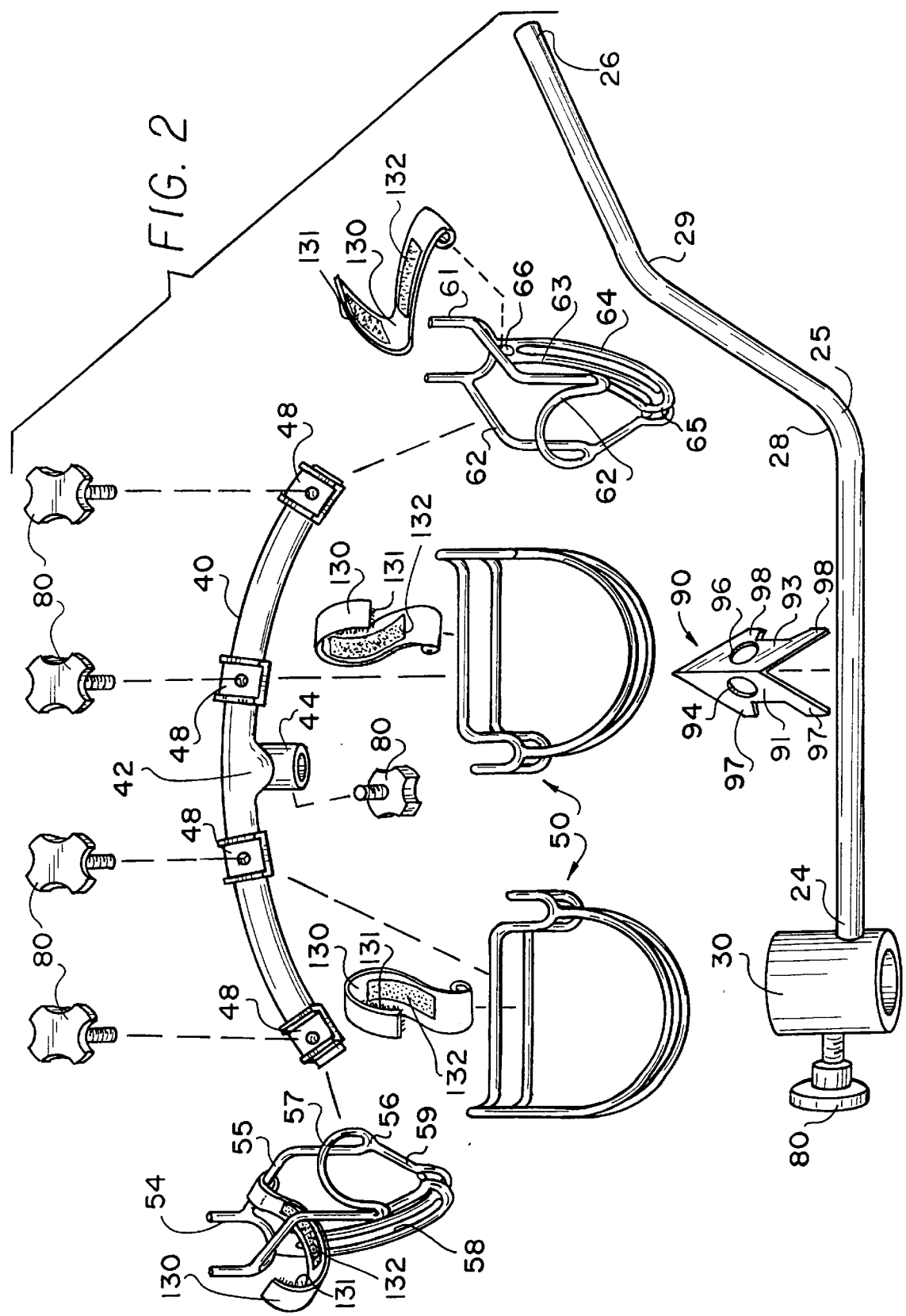
FIG. 2 is an exploded view of the multiple fishing rod holder.

Referring to FIG. 1 and FIG. 2, the multiple fishing rod holder 10 includes a main support arm 20 having a support rod 22 and a collar 30. The support rod 22 has a back end 24, a front end 26, an obtuse first upward bend 28 proximate the midpoint of the rod 25, a second obtuse downward bend 29 located between the midpoint 25 and the front end 26. The collar 30 is a tube, with a diameter substantially equal to the length of its vertical axis, integrally attached to the back end 24 of the support rod 22, such that the radial axis of the tubular cellar 30 and the support rod 22 are coplanar. The collar 30 is adapted to be slid over and releasably attached to a vertical column V by a hand operated threaded fastener 80. A cleat 90 is attached to the support rod 22 which prevents the main support arm 20 from pivoting at the collar 30 about the vertical column V as a result of forces acting on the fishing rods F.

Figure 3A:
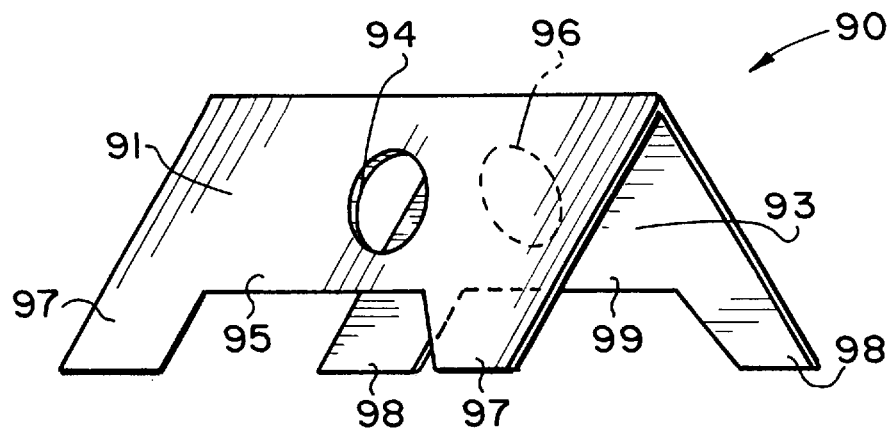
FIG. 3A is a perspective view of a friction cleat.

Referring to FIG. 3A, the friction cleat 90 is a unitary substantially rectangular member is bent at an acute angle at its midpoint forming a first side 91 and a second side 93. A first rod receiving hole 94 is positioned at the center of the first side 91 and a second rod receiving hole 96 is positioned at the center of the second side 93. A trapezoidal section is cut from the front 95 of the first side forming a first pair of legs 97 and a trapezoidal section is cut from a back 99 of the second side 93 forming a second pair of legs 98. In order to fit the friction cleat 90 onto the support rod 22 the first side 91 is releasably biased toward the second side 93 thereby aligning the first rod receiving hole 94 with the second rod receiving hole 96. The rod receiving holes 94, 96 of the cleat 90 are slid over the support rod 22 with the first 97 pair of legs and second pair of legs 98 facing downward. The first side 91 and the second side 93 are released and the first rod receiving hole 94 and the second rod receiving hole 96 bind against the support rod 22.

Figure 3B:
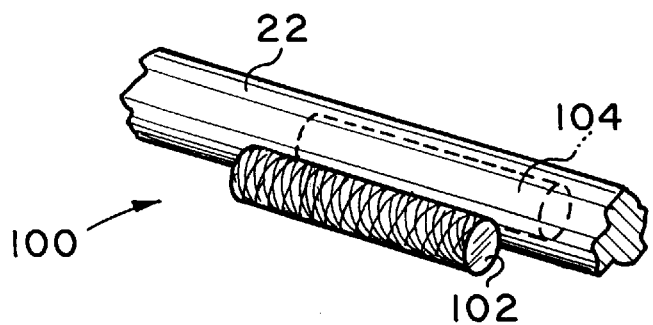
FIG. 3B is a perspective view of a friction cleat having two arcuate binding feet.

Referring to FIG. 3B, a simple alternative embodiment of a friction cleat 100 uses a first knurled rod 102 welded to the bottom of the support rod 22 and a second knurled rod 104 welded to the bottom of the support rod 22.

Figure 3C:
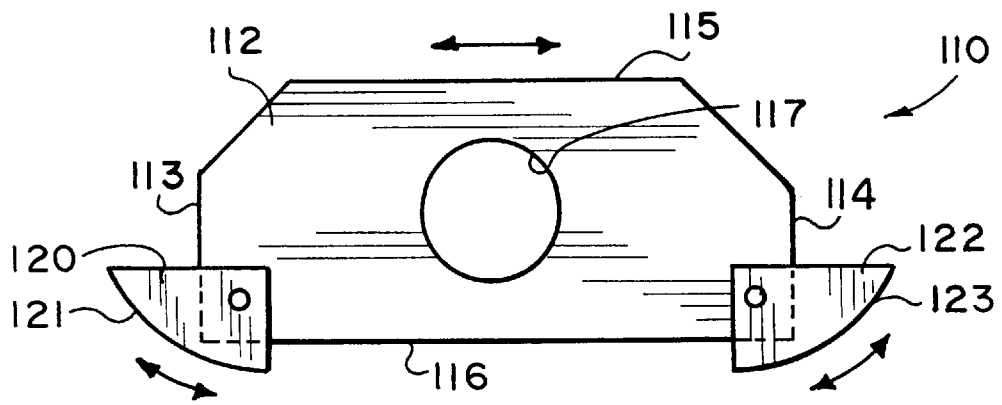
FIG. 3C is a perspective view of a rod-pair friction cleat.

Referring to FIG. 3C yet another alternative embodiment of a friction cleat 110 has a substantially rectangular base 112 having a left side 113, a right side 114, a top 115, a bottom 116, and a rod receiving hole 117 disposed in the center. A first arcuate binding foot 120 is pivotally attached to the base 112 proximate the intersection of the left side 113 and the bottom 116 and a second arcuate binding foot 122 is pivotally attached to the base 112 proximate the intersection of the right side 114 and the bottom 116. The first arcuate binding foot 120 has a striated arc of increasing radius 121 and the second arcuate binding foot 122 has a striated arc of increasing radius 123. Upon lateral movement of the base 112, either the first arcuate binding foot 120 pivots in the direction of the increase in radius of striated arc 121 or the second arcuate binding foot 122 pivots in the direction of the increase in radius of striated arc 123 thereby wedging the binding foot between the base 112 and the surface upon which binding feet 120, 121 are supported.

The multiple fishing rod holder 10 further includes an arcuate support member 40 having a rod end receiving tube 44 integrally attached to the midpoint 42 thereof, and a plurality of coplanar, regularly spaced threaded fastener receiving blocks 48 integrally attached thereto. The arcuate support member 40 is releasably attached to the front end 26 of the support rod 22 by a hand operated threaded fastener 80.

A plurality of fishing rod cradles 50 are pivotally attached to the regularly spaced threaded fastener receiving blocks 48 by hand operated threaded fasteners 80. Each fishing rod cradle 50 is formed of a plurality of rigid wires welded together to form an open U-shaped receiver 54, parallel horizontal side rails 55, a closed looped stabilizer 56, and an arcuate pivot support slot 58. In the preferred embodiment, the plurality of wires is made up of a first wire 61, a second wire 62, a third wire 63, a fourth wire 64, a fifth wire 65, and a sixth wire 66, all integrally attached together. The first wire 61 forms the open U-shaped receiver. The second wire forms the parallel horizontal side rails 55 and the top semi-circle 57 of the closed looped stabilizer 56. The third wire 63 and the fourth wire 64 together form the arcuate pivot support slot 58 and the lower V-shaped portion 59 of the closed looped stabilizer 56. The third wire 63 and the fourth 64 wire are separated by the fifth wire 65 and the six wire 66 which define the width of the pivot support slot 58. To prevent the cradles 50 from scratching or otherwise damaging the fishing rods F they hold, the cradles 50 are substantially covered by an elastomeric sheath (not shown). A VELCRO strap 130 having complimentary patches 131, 132 of hook-and-loop fastening material is attached to the parallel horizontal side rails 55 of the each fishing rod cradle 50 allows a fishing rod F to be releasably secured to the fishing rod cradle 50 thereby preventing loss of an unattended fishing rod F.

It is to be understood that the present invention is not limited to the embodiment described above, but encompasses any and all embodiments within the scope of the following claims.

We claim:

1. A multiple fishing rod holder comprising:

a main support arm including a support rod and a collar;

an arcuate support member with a midpoint;

a rod end receiving tube integrally attached to said support member midpoint a plurality of coplanar, regularly spaced, threaded fastener receiving blocks integrally attached to said arcuate support member;

a plurality of fishing rod cradles pivotally attached to said regularly spaced threaded fastener receiving blocks;

a plurality of hand operated threaded fasteners for attaching said cradles to their respective said blocks;

a friction cleat attached to said main support arm;

said support rod having a left end, a right end, an obtuse first upward bend proximate the midpoint of said rod, and a second obtuse downward bend located between said midpoint and said right end;

said friction cleat being attached to said main support arm between said obtuse first upward bend proximate the midpoint of said rod and said collar;

said collar being a tube integrally attached to said support rod, such that the radial axes of the tube and said support rod are substantially coincident, to said left end of said support rod, said collar being adapted to be slid over and releasably attached to a vertical column by a fastener; and said arcuate support member being releasably attached to said right end of said support rod by said rod end receiving tube and a fastener.

2. The multiple fishing rod holder as defined in claim 1, wherein said fishing rod cradle is formed of a plurality of elongated, rigid wires integrally attached together to form parallel horizontal side rails, an open U-shaped receiver, a closed looped stabilizer, and an arcuate pivot support slot.

3. The multiple fishing rod holder as defined in claim 1, wherein said cradle is substantially covered by an elastomeric sheath.

4. The multiple fishing rod holder as defined in claim 1, including a strap attached to said fishing rod cradle, said strap having complimentary patches of hook-and-loop fastening material for releasably securing a fishing rod in said fishing rod cradle.

5. The multiple fishing rod holder as defined in claim 1, wherein said hand operated threaded fasteners comprise a knurled knob and a threaded metal rod.

6. The multiple fishing rod holder as defined in claim 1, wherein said friction cleat comprises:

a unitary substantially rectangular member having a front and a back; wherein, said unitary substantially rectangular member is bent at an acute angle at its midpoint forming a first side including said front and a second side including said back;

a first rod receiving hole is positioned at the center of said first side;

a second rod receiving hole is positioned at the center of said second side;

a trapezoidal section is cut from said front of said first side forming a first pair of legs; and a trapezoidal section is cut from said back of said first side forming a second pair of legs, wherein, said first side is releasably biased toward said second side thereby aligning said first rod receiving hole with said second rod receiving hole;

said rod receiving holes of said cleat are slid over said support rod with said first and second pair of legs facing downward, said first side and said second side are released and said first rod receiving hole and said second rod receiving hole bind against said support rod.

7. The multiple fishing rod holder as defined in claim 1, wherein said friction cleat comprises:

a substantially rectangular base having a left side, aright side, a top, a bottom, and a rod receiving hole disposed in the center thereof;

a first arcuate binding foot pivotally attached to said base proximate the intersection of said left side and said bottom; and a second arcuate binding foot pivotally attached to said base proximate the intersection of said right side and said bottom; wherein, said first arcuate binding foot has a striated arc of increasing radius;

said second arcuate binding foot has a striated arc of increasing radius;

upon lateral movement of said base, one of said binding feet pivots in the direction of the increase in radius of the arc thereby wedging said binding foot between said base and the surface upon which binding foot is supported.

8. The multiple fishing rod holder as defined in claim 1, wherein said friction cleat comprises:

a first knurled rod welded the bottom of said main support rod; and a second knurled rod welded the bottom of said main support rod.

9. The multiple fishing rod holder as defined in claim 2, including a strap attached to said parallel horizontal side rails of said fishing rod cradle, said strap having complimentary patches of hook-and-loop fastening material for releasably securing a fishing rod in said fishing rod cradle.

10. The multiple fishing rod holder as defined in claim 2, wherein:

said wires making up said cradle comprise a first wire, a second wire, a third wire, a fourth wire, a fifth wire, and a sixth wire, all integrally attached together;

said first wire forming said open U-shaped receiver;

said second wire forming said parallel horizontal side rails and top semi-circle of said closed looped stabilizer;

said third wire and said fourth wire together forming an arcuate pivot support slot and the lower V-shaped portion of said closed looped stabilizer; and said third wire and said fourth wire being separated by said fifth wire and said six wire which define the width of said pivot support slot.

11. The multiple fishing rod holder as defined in claim 10, wherein: a strap attached to said second wire forming said parallel horizontal side rails of said fishing rod cradle, said strap having complimentary patches of hook-and-loop fastening material for releasably securing a fishing rod in said fishing rod cradle.

* * * * *